United States Patent [19]

Zinsmeyer

[11] Patent Number: 4,514,991
[45] Date of Patent: May 7, 1985

[54] VARIABLE SPEED DRIVE MOTOR SYSTEM WITH INVERTER CONTROL

[75] Inventor: Thomas M. Zinsmeyer, Pennellville, N.Y.

[73] Assignee: Carrier Corporation, Syracuse, N.Y.

[21] Appl. No.: 542,640

[22] Filed: Oct. 17, 1983

[51] Int. Cl.³ .......................... F25B 1/00; F16H 37/06
[52] U.S. Cl. .................................... 62/209; 62/228.4; 74/675; 74/681
[58] Field of Search .................. 74/681, 675, 686; 318/8, 76; 290/40 A, 4 A, 4 C, 4 B; 62/215, 228.4, 323.4, 209

[56] References Cited

U.S. PATENT DOCUMENTS

| | | | |
|---|---|---|---|
| 2,366,646 | 1/1945 | Orr | 74/675 |
| 3,355,906 | 12/1967 | Newton | 62/209 |
| 3,503,281 | 3/1970 | Gsching et al. | 74/732 |
| 3,566,717 | 3/1971 | Berman et al. | 74/686 X |
| 3,861,484 | 1/1975 | Joslin | 74/675 X |
| 4,086,019 | 4/1978 | Poole | 415/18 |
| 4,151,725 | 5/1979 | Kountz et al. | 62/182 |
| 4,275,987 | 6/1981 | Kountz et al. | 415/17 |
| 4,279,177 | 7/1981 | Yamashita | 74/681 X |
| 4,282,718 | 8/1981 | Kountz et al. | 62/115 |
| 4,282,719 | 8/1981 | Kountz et al. | 62/115 |
| 4,355,948 | 10/1982 | Kountz et al. | 415/1 |

OTHER PUBLICATIONS

Phillips, Graham R., "Motors and Inverters...", *Power Transmission Design*, vol. 21, No. 12, pp. 38-40 and pp. 45-47, Dec. 1979 (Penton/IPC, Cleveland, Ohio).

*Primary Examiner*—Harry B. Tanner
*Attorney, Agent, or Firm*—Douglas F. Miller

[57] ABSTRACT

A variable speed drive motor system is disclosed. The motor system is particularly suitable for use as a drive system for a centrifugal compressor in a refrigeration system. The motor system includes an AC auxiliary motor/generator with inverter control. The motor/generator is interconnected through a transmission system to a main motor to drive an output drive shaft at varying speeds. Preferably, the interconnecting transmission system is an epicyclic gear system.

4 Claims, 3 Drawing Figures

VARIABLE SPEED DRIVE MOTOR SYSTEM WITH INVERTER CONTROL

BACKGROUND OF THE INVENTION

The present invention generally relates to variable speed drive motor systems and more particularly relates to variable speed drive motor systems for driving centrifugal compressors in refrigeration systems.

Operating efficiency of certain machinery depends on output shaft speed of a motor used to drive the machinery. The operating efficiency of such machinery may be optimized by proper control of the output shaft speed of the motor. For example, in a refrigeration system having a centrifugal compressor driven by an alternating current (AC) induction motor, operating efficiency of the compresser depends on rotational speed of the compressor as a function of compressor flow requirements (load on the compressor) and compressor lift requirements (pressure difference across the compressor). Thus, operating efficiency of the centrifugal compressor may be optimized by adjusting the output shaft speed of the AC induction motor driving the compressor, to properly match the rotational speed of the compressor to the compressor flow requirements and the compressor lift requirements as a function of time.

Control systems are known for continuously varying the output shaft speed of an AC induction motor, such as an AC induction motor used to drive a hermetic centrifugal compressor in a refrigeration system. These control systems comprise an inverter which directly regulates AC induction motor output shaft speed by controlling frequency and magnitude of electrical voltage signals supplied to electrical windings of the motor. In general, the complexity, size, and cost of such an inverter based control system depends on the electrical power requirements of the AC induction motor. Thus, for AC induction motors having relatively high electrical power requirements, which is typically the situation for AC induction motors driving hermetic centrifugal compressors in refrigeration systems, an inverter based control system is quite complex, relatively large, and very costly. Also, a major disadvantage of such an inverter based control system is that inefficiencies in the inverter plus increased inefficiency in the regulated motor due to inverter control combine to significantly reduce overall drive system efficiency.

Another known kind of control system for varying output drive shaft speed is a control system comprising an epicyclic gear system interconnecting a superimposing electric motor/generator with a main AC induction drive motor. However, this kind of control system is only capable of varying the output drive shaft speed in discrete steps and requires electro-mechanical contactors for switching the superimposing electric motor/generator between its generator function and its motor function. These electro-mechanical contactors and their associated hardware are relatively complex and expensive. Also, this kind of control system typically provides only a few different operating speeds, such as, for example, four operating speeds, and speed changes are abrupt. Also, the rapid, open transition switching of the electromechanical contactors in such a control system creates significant current and torque transients which may have a detrimental effect on the superimposing electric motor/generator and the epicyclic gear system.

In addition to the foregoing, a large number of other systems are known for providing a variable speed output drive. These systems may be generally classified into two categories. One category may be broadly defined as fixed speed inputs which are combined through a mechanical, fluid, or electrical interposing variable speed component. The other category may be broadly defined as various types of variable speed motors. However, these systems are not suitable for certain applications, such as for use in driving a centrifugal compressor in a refrigeration system, for one or more of the following reasons. First, many of these systems are not capable of changing speed while under load. Second, many of these systems are very large, complex and expensive. Third, many of these systems are very inefficient in operation. Fourth, many of these systems are incompatible with certain operating environments such as a refrigerant environment. Lastly, many of these systems present unsatisfactory reliability and service problems.

SUMMARY OF THE INVENTION

Therefore, an object of the present invention is to provide a relatively simple, reliable, and inexpensive variable speed drive motor system for driving certain machinery such as a centrifugal compressor in a refrigeration system.

Another object of the present invention is to provide a relatively simple, reliable, and inexpensive variable speed drive motor system for controlling speed of rotation of a centrifugal compressor in a refrigeration system to optimize operating efficiency of the compressor.

These and other objects of the present invention are attained by a variable speed drive motor system, which may be used to vary the speed of rotation of a centrifugal compressor in a refrigeration system, said motor system comprising a main motor which drives a main motor drive shaft, an AC auxiliary motor/generator which drives an auxiliary motor/generator drive shaft, a transmission system, and an inverter electrically connected to the AC auxiliary motor/generator. The transmission system, which, preferably, is an epicyclic gear system, interconnects the main motor drive shaft and the auxiliary motor/generator drive shaft to drive an output drive shaft at a speed which depends on the speed and direction of rotation of the auxiliary motor/generator drive shaft relative to the speed and direction of rotation of the main motor drive shaft. The inverter receives electrical input control signals and electrical power signals and processes these signals to form electrical excitation signals having selected frequencies and magnitudes. The inverter supplies these electrical excitation signals to electrical windings of the AC auxiliary motor/generator in a selected sequence to rotate the auxiliary motor/generator drive shaft at a speed which directly depends on the selected frequency and magnitude of these electrical excitation signals and in a direction which depends on the selected sequence in which the electrical excitation signals are supplied to the electrical windings of the AC auxiliary motor/generator.

When a variable speed drive motor system as described above is used to vary the speed of rotation a centrifugal compressor in a refrigeration system, various operating parameters of the refrigeration system are monitored by sensors which generate electrical signals indicative of the monitored parameters and provide these signals to a microprocessor. The microprocessor controls the inverter by supplying the electrical input control signals to the inverter which control the operation of the inverter. In this manner, the electrical excitation signals formed by the inverter are directly controlled through the microprocessor in response to refrigeration system operating conditions to vary the rotational speed of the centrifugal compressor in a continuously controlled manner to optimize operating efficiency of the compressor.

A variable speed drive motor system according to the present invention as described above provides several advantages not available with other variable speed drive systems. For example, the AC auxiliary motor/generator of the present invention is relatively small in horsepower relative to the main motor. This is due in part to the capability of the AC auxiliary motor/generator to operate either in a motor mode of operation or a generator mode of operation to effectively extend the range of speeds at which the output drive shaft may be driven by the variable speed drive motor system. Because a relatively small AC auxiliary motor/generator may be used according to the present invention, a relatively small, low cost and compact inverter may be used with the AC auxiliary motor/generator. Also, very importantly, effects of inefficiencies due to the use of an inverter are minimized according to the present invention because the inverter and the AC auxiliary motor/generator only handle a small fraction of the total system power.

BRIEF DESCRIPTION OF THE DRAWINGS

Other objects and advantages of the present invention will be apparent from the following detailed description in conjunction with the accompanying drawings, in which like reference numerals identify like elements, and in which.

DESCRIPTION OF THE PREFERRED EMBODIMENT

Figure 1:
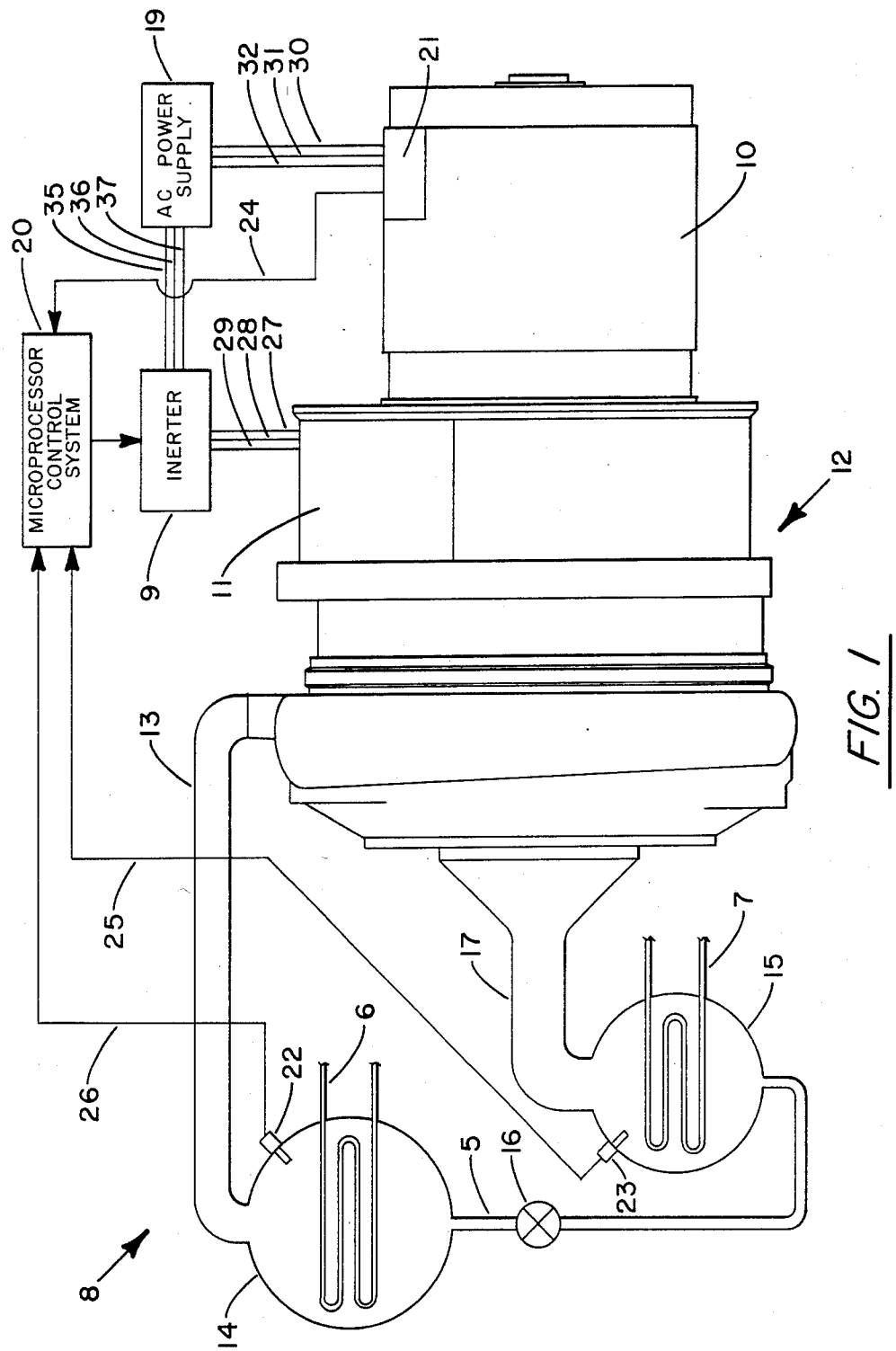
FIG. 1 shows a refrigeration system having a centrifugal compressor with a variable speed drive motor system for varying the speed of rotation of the centrifugal compressor in a continuously controlled manner according to the principles of the present invention.

Referring to FIG. 1, a refrigeration system 8 is shown having a hermetic centrifugal compressor 12 with a variable speed drive motor system for varying the speed of rotation of the centrifugal compressor 12 in a continuously controlled manner according to the principles of the present invention. Although the present invention is being described herein for use in driving a hermetic centrifugal compressor in a refrigeration system, it should be noted that the present invention is suitable for use in many other applications including, for example, use with centrifugal compressors and centrifugal pumps which are not hermetic.

As shown in FIG. 1, the refrigeration system 8 includes a condenser 14, an evaporator 15, and an expansion valve 16. In operation, compressed gaseous refrigerant is discharged from the compressor 12 through discharge line 13 to the condenser 14 wherein the gaseous refrigerant is condensed by relatively cool condensing water flowing through tubing 6 in the condenser 14. The condensed liquid refrigerant from the condenser 14 passes through the expansion valve 16 in line 5 to evaporator 15. The liquid refrigerant in the evaporator 15 is evaporated to cool a heat transfer fluid flowing through tubing 7 in the evaporator 15. This heat transfer fluid is used to cool a building or is used for other such purposes. The gaseous refrigerant from the evaporator 15 flows through line 17 back to compressor 12 under control of compressor inlet guide vanes 4 (see FIG. 2). The gaseous refrigerant entering the compressor 12 through the guide vanes 4 in the line 17 is compressed by the compressor 12 and discharged from the compressor 12 through the discharge line 13 to begin the refrigeration cycle again.

Operating efficiency of the compressor 12 and overall operating efficiency of the refrigeration system 8 are optimized through operation of the variable speed drive motor system according to the present invention. The motor system operates to continuously match the rotational speed of the centrifugal compressor 12 to load on the refrigeration system 8, which determines the compressor 12 flow requirements, and to compressor 12 lift requirements, over a selected operating range of the compressor 12. For example, at relatively high load and high lift requirements, capacity control may be achieved by only varying the rotational speed of the centrifugal compressor. At intermediate loads and lifts, both rotational speed of the compressor 12 and adjustment of the inlet guide vanes 4 may be used to achieve desired capacity control. At about 50% load and corresponding lift the rotational speed of the compressor 12 would reach a minimum value of, for example, 70%, and for loads below 50% the compressor 12 would operate continuously at 70% of design operating speed and the inlet guide vanes 4 alone would control capacity. The foregoing is only one type of control methodology which may be used to optimize operating efficiencies with a variable speed drive motor system according to the present invention. One of ordinary skill in the art to which the present invention pertains will readily perceive other types of control methodology.

Figure 2:
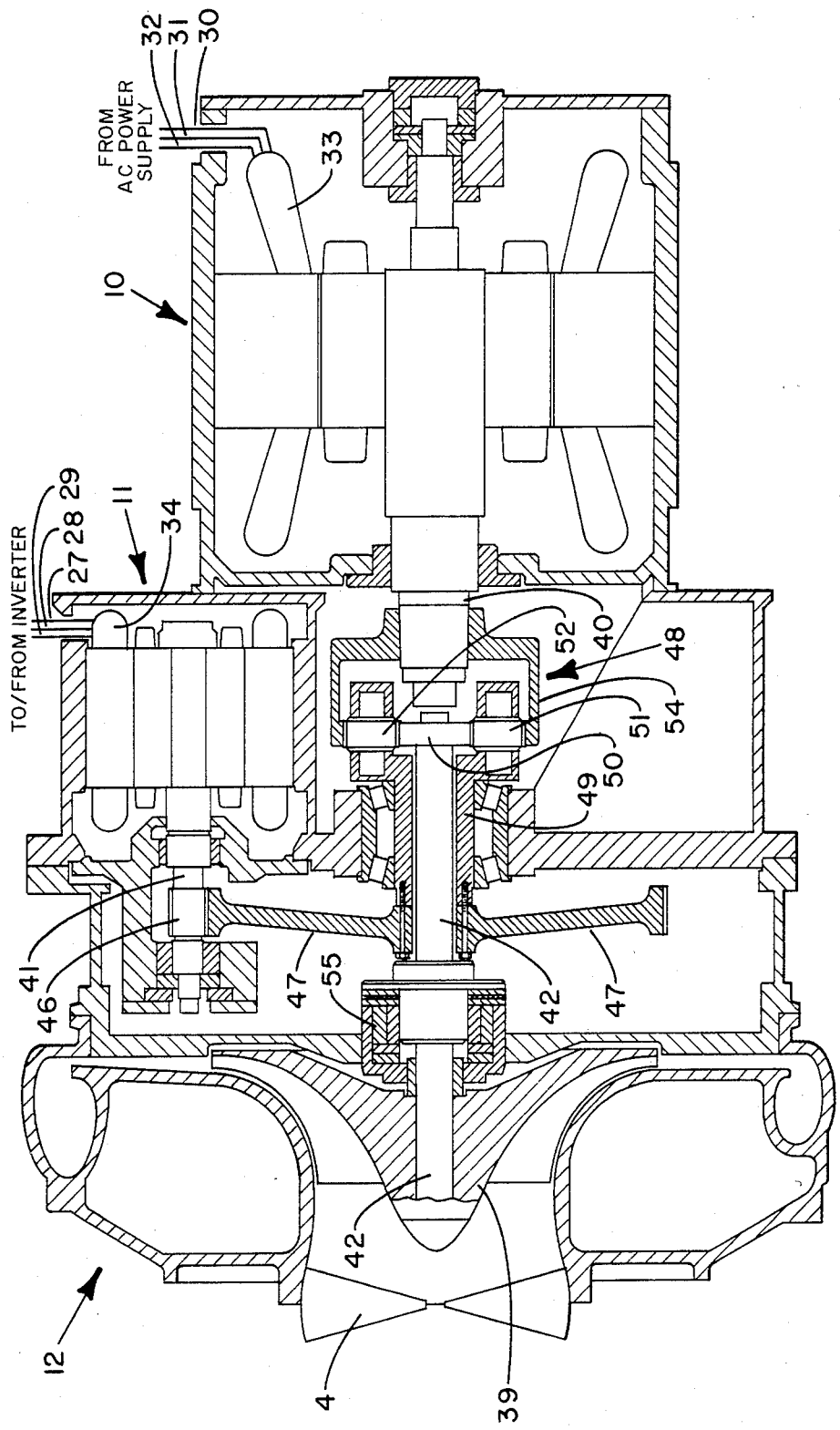
FIG. 2 is a cross-sectional view of the hermetic centrifugal compressor shown in FIG. 1.

As shown in FIGS. 1 and 2, the variable speed drive motor system according to the present invention, includes a main motor 10 which drives a main motor drive shaft 40, an AC auxiliary motor/generator 11 which drives an auxiliary motor/generator drive shaft 41, a three phase AC power supply 19, an inverter 9, and a microprocessor control system 20. The main motor 10 and the AC auxiliary motor/generator 11 are interconnected through a transmission system 48 (see FIG. 2) to drive an output drive shaft 42 which, in turn, rotates impeller 39 of the centrifugal compressor 12. The speed of rotation of the impeller 39 of the centrifugal compressor 12 ultimately depends on the speed and direction of rotation of the auxiliary motor/generator drive shaft 41 about its longitudinal axis relative to the speed and direction of rotation of the main motor drive shaft 40 about its longitudinal axis as described in detail below.

As shown in FIGS. 1 and 2, the main motor 10 is a three phase AC induction motor, such as a 300 horsepower motor, which operates at a selected fixed speed and which is powered through main motor electrical lines 30, 31, and 32 by the three phase AC power supply 19. Although the main motor 10 shown in FIGS. 1 and 2 is a three phase AC induction motor, the main motor 10 may be any type of fixed speed motor suitable for use in driving a hermetic centrifugal compressor. Of course, in a different application, the main motor 10 may be still a different type of fixed speed motor.

Also, as shown in FIGS. 1 and 2, the AC auxiliary motor/generator 11 is a three phase AC induction motor, such as a 30 horsepower, three phase AC hermetic induction motor, controlled by the inverter 9. However, the AC auxiliary motor/generator 11 may be any AC motor suitable for use with an inverter. For example, if desired, the AC auxiliary motor/generator 11 may be a type of AC motor which is not capable of operating as a generator. Of course, if the AC auxiliary motor/generator 11 is not capable of operating as a generator then the variable speed operating range of the overall motor system according to the present invention will be significantly reduced. However, this may be acceptable in certain applications. Therefore, throughout this patent application, it is to be understood that the term "AC auxiliary motor/generator" includes devices which are capable of providing only a motor function as well as devices, such as AC induction motors, which may be operated as a motor or as a generator. Further, as shown in FIG. 1, electrical power is supplied to or from the AC power supply 19 through electrical lines 35, 36, and 37 to or from the inverter 9 which controls power flow through auxiliary motor/generator electrical lines 27, 28, and 29 to or from the AC auxiliary motor/generator 11. However, it should be noted that, if desired, a separate power supply may be used to supply the electrical power to or receive the electrical power from the inverter 9.

The inverter 9 may be any inverter suitable for use with the AC auxiliary motor/generator 11. For example, if the AC auxiliary motor/generator 11 is a 30 horsepower, three phase AC induction motor, then the inverter 9 may be a Model 432303 HP Four-quadrant inverter available from Robicon, Inc., 100 Sagamore Hill Road, Plum Industrial Park, Pittsburgh, PA, 15239. If the AC auxiliary motor/generator 11 is a three phase AC motor in the 7.5 to 50 horsepower range which is designed to operate only in the motor mode then the inverter 9 may be a Westinghouse Electric Corporation Model Accutrol 300 adjustable frequency motor control available from Westinghouse Electric Corporation, Vectrol Division, 110 Douglas Road, P.O. Box 819, Oldsmar, FL 33557. Of course, the AC power supply 19 and the microprocessor control system 20 also must be selected to be compatible with the particular inverter 9 which is selected and this may be easily done by one of ordinary skill in the art to which the present invention pertains.

In either the motor mode or the generator mode of operation of the AC auxiliary motor/generator 11, the inverter 9 supplies selected three phase electrical excitation signals, with each phase having a selected frequency and magnitude, through the auxiliary motor/generator electrical lines 27, 28, and 29 to electrical windings 34 of the AC auxiliary motor/generator 11. The speed of rotation of the auxiliary motor/generator drive shaft 41 about its longitudinal axis, and resulting torque transmitted by the drive shaft 41, depend on the frequency and magnitude of the electrical excitation signals supplied from the inverter 9 to the AC auxiliary motor/generator 11. Also, the direction of rotation of the auxiliary motor/generator drive shaft 41 about its longitudinal axis depends on the sequence in which the electrical excitation signals are supplied via electrical lines 27, 28, and 29 to the AC auxiliary motor/generator 11. In the motor mode of operation, the speed and direction of rotation of the auxiliary motor/generator drive shaft 41 about its longitudinal axis are controlled so that mechanical power outputted from the AC auxiliary motor/generator 11 is summed through the transmission system 48 with mechanical power outputted from the main motor 10. In this manner, the output drive shaft 42 is rotated about its longitudinal axis at a speed greater than the speed at which the output drive shaft 42 may be driven by operation of only the main motor 10. In the generator mode of operation, the speed and direction of rotation of the auxiliary motor/generator drive shaft 41 about its axis are controlled so that a portion of the mechanical power from the main motor 10 is "absorbed" through the transmission system 48 by the AC auxiliary motor/generator 11 which converts this mechanical power to electrical power which is supplied from the AC auxiliary motor/generator 11 back through the auxiliary motor/generator electrical lines 27, 28, and 29 to the inverter 9 and ultimately back through electrical lines 35, 36, and 37, to the AC power supply 19. In the generator mode of operation, the AC auxiliary motor/generator 11 operates to drive the output drive shaft 42 at a speed which is less than the speed at which the output drive shaft 42 can be driven by operation of only the main motor 10. Thus, a range of output drive shaft 42 speeds is attained, with any given output drive shaft 42 speed obtained by controlling the inverter 9 to supply the proper electrical excitation signals to the AC auxiliary motor/generator 11 to produce the desired mechanical effect which will bring the output drive shaft 42 to the desired speed.

Also, with regard to the generator mode of operation, an important aspect to note is that the range of output drive shaft 42 speed obtainable with a given variable speed drive motor system can be extended by taking full advantage of the capabilities of the inverter 9. Most commercially avaiable inverters cover a frequency range of approximately 10 to 120 hertz (Hz). With the inverter 9 operating between 10 and 60 hertz, the AC auxiliary motor/generator 11 is capable of handling full load torque. However, above 60 hertz, the inverter 9 limits the amount of energy the AC auxiliary motor/generator 11 can deliver or absorb. That is, from 60 to 120 hertz the torque that the AC auxiliary motor/generator 11 can handle reduces with increased speed. However, compressor torque requirements for a centrifugal compressor in a refrigeration system generally vary as the square of the speed. Therefore, the AC auxiliary motor/generator 11 may be operated above its rated speed in the generator mode of operation since, although the AC auxiliary motor/generator 11 torque capability is limited in this region, it is still adequate to handle the load imposed by the centrifugal compressor.

As shown in FIG. 1, the inverter 9 is controlled by the microprocessor control system 20 which supplies electrical input control signals to the inverter 9 which control what electrical excitation signals will be formed by the inverter 9 and supplied by the inverter 9 to the AC auxiliary motor/generator 11. Sensors, such as main motor current sensor 21, condenser refrigerant temperature sensor 22, and evaporator refrigerant temperature sensor 23, continuously supply electrical input signals to the microprocessor control system 20 from which the microprocessor control system 20 determines the lift and load requirements for the compressor 12. Based on these determinations, the microprocessor control system 20 generates and supplies the electrical input control signals for the inverter 9 to control operation of the inverter 9 which, in turn, controls operation of the AC auxiliary motor/generator 11 to provide a desired variable speed output at the output drive shaft 42. The output drive shaft 42 is controlled to rotate the impeller 39 of the compressor 12 at a speed matched to the flow and lift requirements for the compressor 12 to optimize operating efficiency of the compressor 12 thereby optimizing overall operating efficiency of the refrigeration system 8 as described previously.

Of course, one of ordinary skill in the art to which the present invention pertains, will readily perceive other means for obtaining inputs which may be used in optimizing operating efficiencies according to the principles of the present invention. For example, microprocessor control system 20 may receive electrical input signals from sensors which sense parameters such as guide vane 4 position, temperature of the heat transfer fluid leaving the tubing 7 in the evaporator 15, speed of rotation of the AC auxiliary motor/generator 11, and speed of rotation of the output drive shaft 42. Then, based on these electrical input signals the microprocessor control system 20 may generate the electrical input control signals for the inverter 9 which ultimately vary the speed of rotation of the output drive shaft 42 to achieve optimal operating efficiencies.

Figure 3:
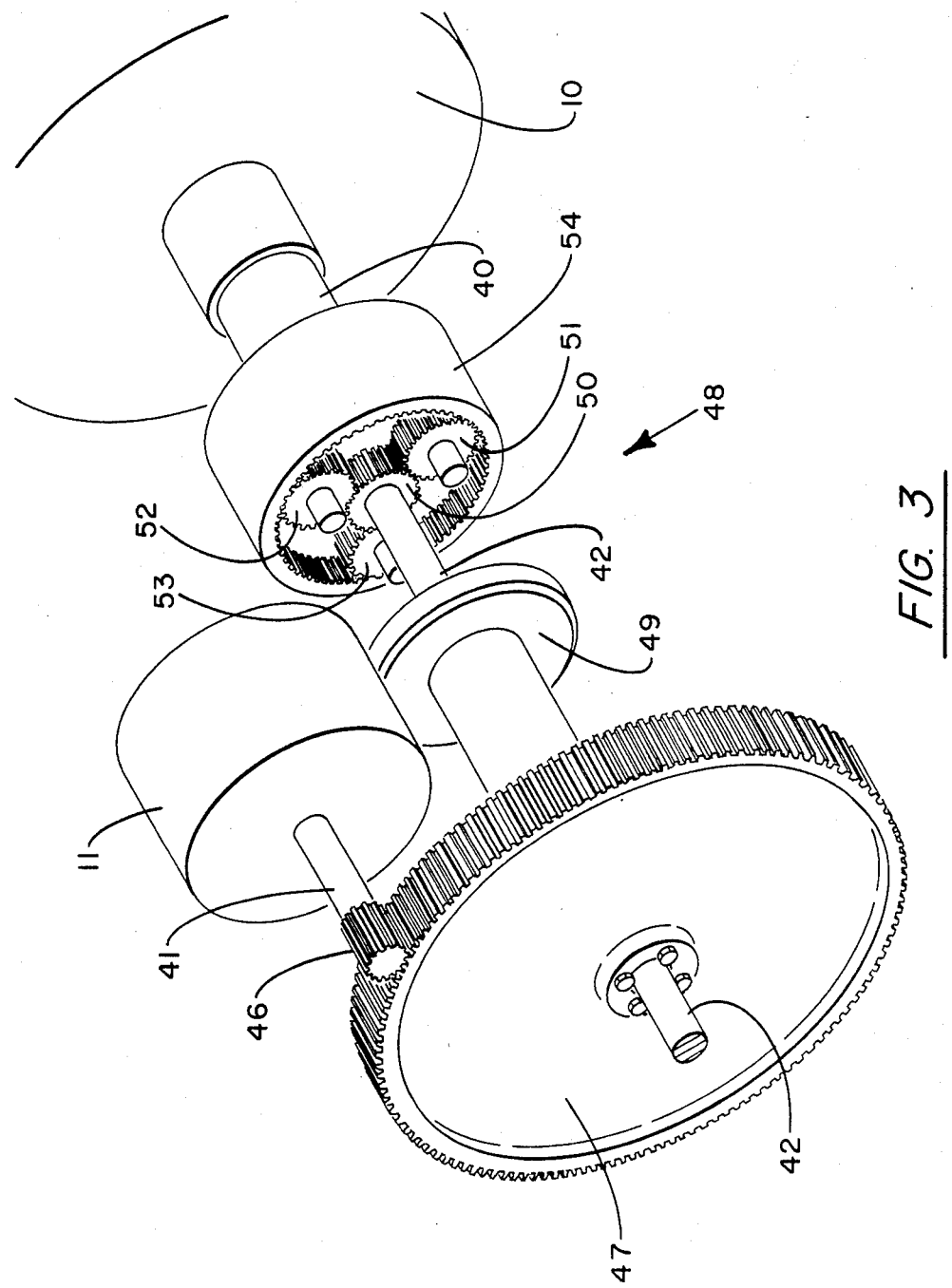
FIG. 3 is a perspective and partially exploded view of the epicyclic gear system which forms a transmission system for the hermetic centrifugal compressor shown in FIG. 2.

Referring to FIG. 2, a cross-sectional view is shown of the hermetic centrifugal compressor 12, including the main motor 10 and the AC auxiliary motor/generator 11, shown in FIG. 1. Also, FIG. 2 shows a cross-section of the transmission system 48 interconnecting the main motor 10 and the AC auxiliary motor/generator 11 to the output drive shaft 42 for the impeller 39 of the compressor 12. FIG. 3 is a perspective and partially exploded view of the transmission system 48 shown in FIG. 2.

Preferably, as shown in FIGS. 2 and 3, the transmission system 48 is an epicyclic gear system. However, one of ordinary skill in the art to which the present invention pertains will readily recognize that many different kinds of transmission systems may be used to interconnect the main motor 10 and the AC auxiliary motor/generator 11 to the output drive shaft 42 according to the principles of the present invention. In fact, a different transmission system 48 may be desirable depending on the particular application for a variable speed drive motor system according to the present invention.

As shown in FIGS. 2 and 3, the epicyclic gear system forming the transmission system 48 comprises a ring gear 54, a planet gear carrier 49 having three planet gears 51, 52, and 53, and a sun gear 50. The planet gear carrier 49, the sun gear 50, and the ring gear 54 are each held in position so that each of these gears can rotate about its central longitudinal axis when a torque is applied to the gear. The three planet gears 51, 52, and 53 are mounted in the planet gear carrier 49 so that each of the planet gears 51, 52, and 53 can rotate about its central longitudinal axis while simultaneously rotating about the central longitudinal axis of the planet gear carrier 49 when the planet gear carrier 49 itself is rotated about its central longitudinal axis.

The planet gear carrier 49 is attached to a first drive gear 47 which, in turn, is in driving engagement with a fixedly positioned second drive gear 46 which is directly connected to the auxiliary motor/generator drive shaft 41 of the AC auxiliary motor/generator 11. The ring gear 54 is directly connected to the main motor drive shaft 40 so that the ring gear 54 may be rotated about its central longitudinal axis by rotation of the main motor drive shaft 40 about its central longitudinal axis. Inner teeth of the ring gear 54 are in driving engagement with each of the three planet gears 51, 52, and 53 of the planet gear carrier 49 so that rotational forces can be transmitted between the planet gears 51, 52, and 53 and the ring gear 54.

The three planet gears 51, 52, and 53 surround the sun gear 50 and are in driving engagement therewith. As best shown in FIG. 2, the sun gear 50 is directly attached to the output drive shaft 42 which extends through a central opening in the planet gear carrier 49 and through a corresponding central opening in the drive gear 47 through thrust bearing housing 55 to the impeller 39 of the centrifugal compressor 12. Thus, any rotation of the sun gear 50 about its central longitudinal axis is directly transmitted as a torque on the impeller 39. The output drive shaft 42 does not operatively engage the planet gear carrier 49 or the drive gear 47 and simply extends through the central openings in these elements. As will be readily apparent to one of ordinary skill in the art to which the present invention pertains, the foregoing described epicylic gear system effectively combines mechanical power inputs from the main motor 10 and the AC auxiliary motor/generator 11 through the rotation of the planetary gear carrier 49 about its central longitudinal axis relative to the rotation of the ring gear 54 about its central longitudinal axis. In this manner, the sun gear 50 is rotated about its central longitudinal axis at a speed which depends on the speed of rotation of the planet gear carrier 49, about its axis relative to the speed of rotation of the ring gear 54 about its central longitudinal axis. If the AC auxiliary motor/generator 11 is operated in the motor mode so that the planet gear carrier 49 is rotated in a direction opposite to the direction of rotation of the ring gear 54 then mechanical power inputted from the AC auxiliary motor/generator 11 is combined with mechanical power outputted from the main motor 10 to rotate the output drive shaft 42 at a speed above the speed at which the output drive shaft 42 can be rotated by operation of the main motor 10 alone. The speed of rotation of the output drive shaft 42 directly depends on the speed at which the AC auxiliary motor/generator 11 is operated. Alternatively, in the generator mode of operation, the planet gear carrier 49 is rotated about its axis in the same direction of rotation relative to the direction of rotation of the ring gear 54 about its central longitudinal axis so that the output drive shaft 42 is rotated at a speed below the speed at which the output drive shaft 42 may be rotated by operation of the main motor 10 alone. Again, the speed of rotation of the output drive shaft 42 directly depends on the speed at which the AC auxiliary motor/generator 11 is operated. Of course, the foregoing description is directed to a preferred embodiment of the present invention and various modifications and other embodiments of the present invention will be readily apparent to one of ordinary skill in the art to which the present invention pertains. For example, although the present invention has been described as a variable speed drive motor system with inverter control for driving a hermetic centrifugal compressor in a refrigeration system, the principles of the present invention are also generally applicable to variable speed drive motor systems in many other applications. Therefore, while the present invention has been described in conjunction with a particular embodiment it is to be understood that various modifications and other embodiments of the present invention may be made without departing from the scope of the invention as described herein and as claimed in the amended claims.

What is claimed is:

1. A variable speed drive motor system for a centrifugal compressor in a vapor compression refrigeration system comprising:

a main motor means for rotating a main motor drive shaft about its longitudinal axis at a fixed speed;

an AC auxiliary motor/generator means for receiving electrical excitation signals in a selected sequence, each of said excitation signals having a selected frequency and magnitude, and for rotating an auxiliary motor/generator drive shaft about its longitudinal axis at a speed and in a direction which depend on the selected sequencing, frequencies, and magnitudes of the received electrical excitation signals wherein during the upper half of the compressor speed range the AC auxiliary motor/generator means rotates in a first direction and during the lower half of the speed range of the compressor the motor/generator means rotates in the opposite direction;

an output drive shaft for rotating an impeller of the centrifugal compressor when said output drive shaft is rotated about its longitudinal axis;

a transmission means for interconnecting the main motor drive shaft and the auxiiary motor/generator drive shaft to the output drive shaft to rotate the output drive shaft about its longitudinal axis at a speed which depends on the speed and direction of rotation of the auxiliary motor/generator drive shaft relative to the speed and direction of rotation of the main motor drive shaft;

an inverter means for receiving electrical power signals and electrical control signals, for processing said received electrical power signals and electrical control signals to form electrical excitation signals each having a selected frequency and magnitude which is determined by the received electrical control signals, and for supplying said electrical excitation signals to the AC auxiliary motor/generator means in a selected sequence which also is determined by the received electrical control signals;

power supply means for supplying the electrical power signals to the inerter means; and a control means for monitoring selected operating conditions of the refrigeration system, and for generating electrical control signals in response to the monitored operating conditions, and for supplying these generated electrical control signals to the inverter means to vary the speed of rotation of the output drive shaft in a desired manner.

2. A variable speed drive motor system for a centrifugal compressor in a vapor compression refrigeration system as recited in claim 1 wherein said control means comprises:

a first sensor means for continuously sensing condenser refrigerant temperature and for generating electrical signals indicative of the sensed condenser refrigerant temperatures;

a second sensor means for continuously sensing evaporator refrigerant temperature and for generating electrical signals indicative of the sensed evaporator refrigerant temperatures;

a third sensor means for continuously sensing electrical current flow to the main motor means and for generating electrical signals indicative of the sensed current flow; and a microprocessor control system for receiving the electrical signals generated by the first, second and third sensor means, for processing said received electrical signals to determine the flow and lift requirements for the centrifugal compressor and to determine an optimal speed of rotation for the impeller of the centrifugal compressor based on the determined flow and lift requirements, and for generating and supplying electrical control signals to the inverter means to optimally match the speed of rotation of the impeller to the flow and lift requirements for the centrifugal compressor.

3. A variable speed drive motor system for a centrifugal compressor in a vapor compression refrigeration system as recited in claim 1 wherein said transmission means comprises:

an epicyclic gear system.

4. A variable speed drive motor system for a centrifugal compressor in a vapor compression refrigeration system as recited in claim 3 wherein said epicylcic gear system comprises:

a sun gear drivingly connected to the output drive shaft;

a ring gear drivingly connected to the main motor drive shaft; and a planet gear carrier drivingly connected to the auxiliary motor/generator drive shaft and having a plurality of planet gears drivingly connected between the sun gear and the ring gear to transmit torques between the sun gear and the ring gear.

* * * * *